United States Patent Office 2,868,818
Patented Jan. 13, 1959

2,868,818

ALPHA METHYL PHENYLALANINES

Karl Pfister III, Westfield, and Gustav A. Stein, Plainfield, N. J., assignors to Merck & Co., Inc., Rahway, N. J., a corporation of New Jersey No Drawing. Application December 15, 1953
Serial No. 398,418

6 Claims. (Cl. 260—519)

This invention relates to derivatives of alanine and to processes for preparing them and particularly to derivatives of α-methylphenylalanine, to salts thereof and to processes for preparing these compounds.

The new compounds which are the subject of the present invention are compounds having the general formulae:

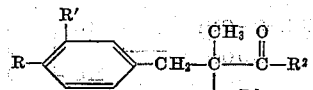

or

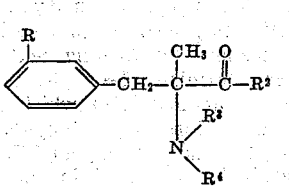

wherein R' is hydrogen, hydroxy, or an alkoxy or acyloxy group having a chain length of from one to four carbon atoms; R is hydroxy, or an alkoxy or acyloxy group having a chain length of from one to four carbon atoms; R² is a hydroxy, amido, or a lower alkoxy group; and R³ and R⁴ are hydrogen, or lower alkyl or acyl groups; and acid addition salts thereof.

The amino acids are white crystalline solids that will decompose when heated at high temperatures and are soluble in hot water but are less soluble in cold water and insoluble in most organic solvents. The acid addition salts such as the hydrochloride, hydrobromide, and sulfate are generally crystalline solids which are readily soluble in cold water and are more soluble in organic solvents than the free amino acids.

The compounds of the invention may be prepared by reacting a compound having the formula

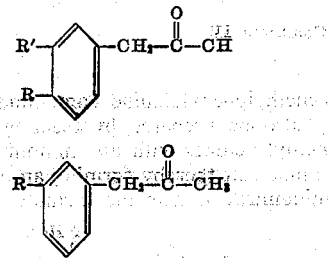

wherein R' is a hydrogen, hydroxy, alkoxy or acyloxy group and R is a hydroxy, alkoxy or acyloxy group, with ammonium carbonate and a cyanide salt to form the corresponding hydantoin (Compound I) which is then hydrolyzed to produce an α-methylphenylalanine derivative having the formula

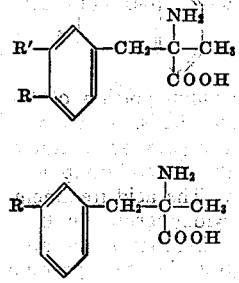

or

wherein R and R' are the same as heretofore described.

The O-alkoxy and O-acyloxy radicals in these α-methylphenylalanine compounds may be converted to hydroxy groups by treating with a mineral acid which will first convert any such substituent in the 3-position of the benzene ring to a hydroxy group (Compound II) and on further treatment will convert any such 4-position substituent to a hydroxy group (Compound III). The acid addition salts thus formed as a result of this treatment may be converted to the free amino acids (Compounds IV and V) by treatment with a basic substance. These reactions may be chemically represented as an example when R and R' are methoxy groups as follows:

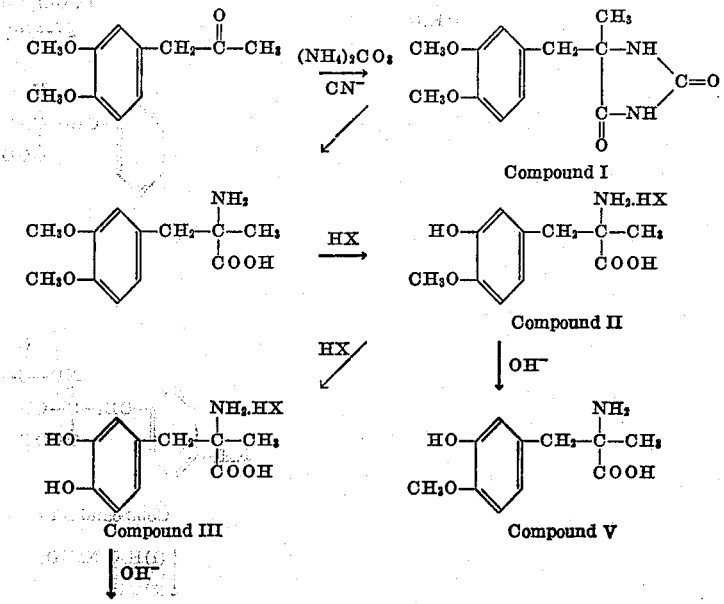

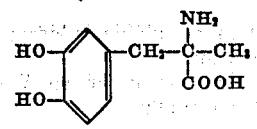

Compound IV

The α-methylphenylalanine compounds of this invention may also be prepared by reacting the substituted-benzyl methyl ketones with an ammonium salt (NH₄X) and a cyanide salt thereby forming an acid addition salt of an aminonitrile having the formula

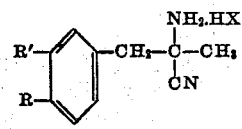

or

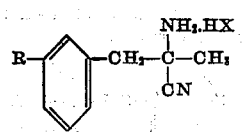

wherein X is the anion portion of the ammonium salt and R and R' are the same as heretofore described, which is then hydrolyzed by treatment with a mineral acid to convert the cyano group to a carboxyl group (Compound VII). The acid treatment will also convert any alkoxy or acyloxy group in the 3-position of the benezene ring to a hydroxy group and on further treatment any such group in the 4-position in the ring will be converted to a hydroxy group (Compound VIII). The acid addition salts thus formed as a result of this acid treatment may be converted to the free amino acids (Compounds IX and X) by treatment with a basic substance. These reactions may be chemically represented, as an example, when R and R' are methoxy groups as follows:

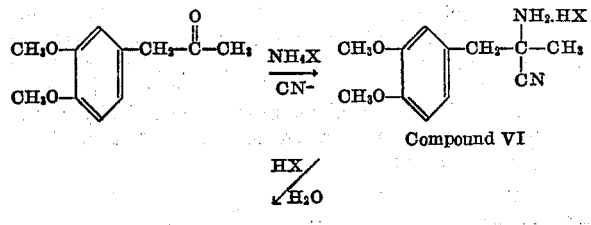

Compound VI

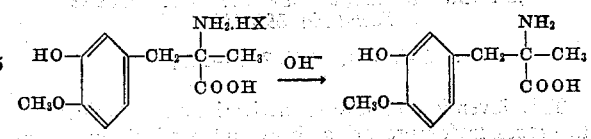

Compound VII    Compound X

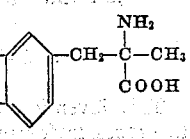

Compound VIII    Compound IX

The compound α-methyl-(4-hydroxy)-phenylalanine (Compond XV) may also be prepared directly from α-methylphenylalanine by treating with dichloroacetyl chloride thereby forming dl-α-methyl-N-dichloroacetyl-phenylalanine (Compound XII) which is then reacted with nitric acid to form dl-α-methyl-N-dichloroacetyl-β-(4-nitrophenyl)-alanine (Compound XIII) which latter compound is hydrogenated in the presence of a hydrogenation catalyst to form dl-α-methyl-N-dichloroacetyl-β-(4-aminophenyl)-alanine (Compound XIV) which is converted to the final product by treatment with an alkali metal nitrite and amineral acid to produce a diazonium compound followed by heating with a mineral acid and precipitation of the α-methyl-β-(4-hydroxyphenyl)-alanine by treatment with a basic substance. Alternately dl-α-methyl-N-dichloroacetyl-β-(4-nitrophenyl)-alanine (Compound XIII) may be reacted with a mineral acid to form the acid addition salt of dl-α-methyl-β-(4-nitrophenyl)-alanine (Compound XVI) which may then be treated with a basic substance to form free dl-α-methyl-β-(4-nitrophenyl)-alanine (Compound XVII). These reactions may be chemically represented as follows:

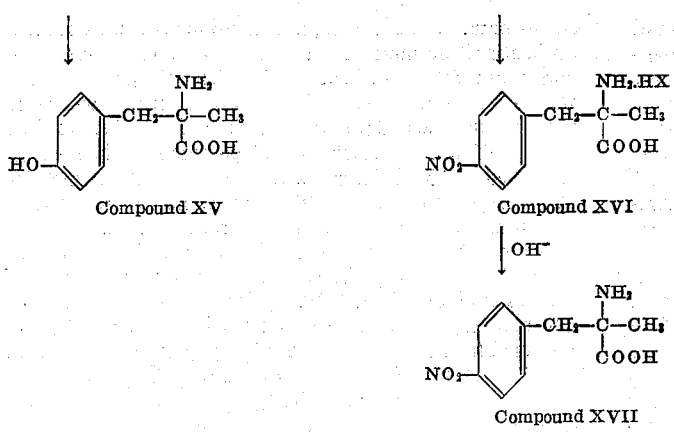

The esters and amides of the α-methyl-substituted phenylalanines may be prepared by reacting these compounds with lower aliphatic alcohols in the presence of a mineral acid to form the esters and by further reacting the esters thus formed with liquid ammonia or amines to form the corresponding amides. The secondary and tertiary amines may be prepared by reacting the primary amines with alkylhalides as for example ethylchloride. The amino group may be acylated by treating with acylating agents.

The substituted-benzyl methyl ketone which is the starting material for preparing the new class of compounds is obtained by treating α-substituted phenyl-acetonitrile dissolved in a solvent with an alkali metal alkoxide for a period of approximately four hours at the reflux temperature of the solvent to form the alkali metal salt of α-(substituted-phenyl)-acetoacetonitrile. The alkali metal group is then removed by treatment with acetic acid and the resulting α-(substituted phenyl)-acetoacetonitrile reacted with a strong mineral acid and heated on a steam bath to produce the substituted-benzyl methyl ketone. Typical examples of such ketones are methyl-(3,4-dimethoxybenzyl) ketone, methyl-(3-methoxy-benzyl) ketone, methyl-(3,4-diacetoxybenzyl) ketone and methyl-(3-propoxybenyl) ketone.

The substituted benzyl methyl ketone is reacted with an ammonium salt or ammonium carbonate, and a cyanide salt by heating the reactants together in an aqueous solution with continual agitation at a temperature within the range of approximately 25 to 100° C. for a period of about four to ten hours and then at normal room temperature for a period of about eight to twelve hours. The product precipitates from the mixture as a white crystalline solid. The precipitation may be aided by concentrating the solution in vacuo at approximately 40° C. The crystalline product is the aminonitrile if an ammonium salt is used or a hydantoin if ammonium carbonate is used. It is preferred to use ammonium carbonate since it results in the formation of approximately three to four times greater yield of final product than can be obtained by the use of an ammonium salt such as ammonium chloride or ammonium bromide.

The 4-methyl-4-(substituted-benzyl)-hydantoin is converted to α-methyl-substituted-phenylalanine by refluxing in an aqueous solution with a base, as for example barium hydroxide, for a period of approximately fifty to seventy hours. The reaction mixture is then adjusted to a pH within the range of approximately 1 to 2 by the addition of a mineral acid which results in the formation of the acid salt of the phenylalanine which is recovered from the solution. The free amino acid is formed by dissolving the salt in a suitable solvent such as water or acetone and then rendering the solution neutral by the addition of a basic substance, such as ammonium hydroxide or a di-substituted amine, which results in the formation of a white crystalline precipitate of α-methyl-substituted-phenylalanine.

The α-methyl-substituted-phenylalanine may be treated with a mineral acid such as hydrochloric acid to convert any alkoxy or acyloxy group at the 3-position in the benzene ring to a hydroxy group and by more drastic treatment with the acid such as by heating at a higher temperature in a bomb tube any such substituent at the 4-position will be likewise converted to a hydroxy group. These conversions may be conveniently carried out by heating the compound with constant boiling hydrobromic acid at reflux temperature. The acid addition salts thus formed as a result of the acid treatment may be treated with a basic substance to form the free amino acid.

The aminonitrile (1 (substituted-phenyl)-2-amino-2-cyano-propane) is treated with a mineral acid by heating on a steam bath for approximately 15 to 20 hours. This treatment will convert the cyano group to a carboxyl group and will also convert any alkoxy or acyloxy group in the 3-position of the benzene ring to a hydroxy group. The product as a result of the acid treatment is the acid addition salt which may be converted to the free amino acid by treatment with a basic substance. By further reaction with the mineral acid such as in a bomb tube at a high temperature any alkoxy or acyloxy group in the 4-position of the benzene ring is converted to a hydroxy group and the acid addition salt formed may be likewise converted to the free amino acid by treatment with a basic substance.

The compound α-methyl-(4-hydroxy-phenyl)-alanine is prepared by treating α-methyl-phenylalanine with dichloroacetylchloride in a sodium hydroxide solution at approximately 0° C. A mineral acid is then added to the solution to precipitate the product, dl-α-methyl-N-dichloroacetylphenylalanine. This product is reacted with cold fuming nitric acid thereby forming dl-α-methyl-N-dichloroacetyl-β-(4-nitrophenyl)-alanine which is dissolved in a solvent and hydrogenated at low pressure in the presence of any of the ordinary hydrogenation catalysts such as for example platinum oxide. The product dl-α-methyl-N-dichloroacetyl-β-(4-aminophenyl) - alanine is then treated with sulfuric acid and sodium nitrite at reduced temperature to produce a diazonium compound. The mixture is then heated until the evolution of nitrogen ceases and then concentrated in vacuo to dryness and the solid dissolved in a solvent such as ethanol. The solvent solution is then treated with a basic substance to precipitate dl-α-methyl - β - (4 - hydroxyphenyl)-alanine. Alternately dl-α-methyl-N-dichloroacetyl - β - (4 - nitrophenyl)-alanine may be reacted with a mineral acid to form the acid addition salt of dl-α-methyl-β-(4-nitrophenyl)-alanine which may be treated with a basic substance to form the free compound.

In the above process steps various organic solvents may be used for carrying out the reactions such as alcohols, ketones, and the like. It is preferred to use mineral acids such as hydrochloric acid and sulfuric acid in forming the acid addition salts of the various compounds and for converting the acyloxy and alkoxy groups to hydroxy groups. The basic substances may be inorganic or organic bases as for example sodium hydroxide, barium hydroxide, diethylamine or other substituted amines.

It is intended that this invention cover the new compounds of the above class regardless for what purpose they are employed and indeed the new class of compounds are useful in many fields of chemistry. For instance, the compounds may be used as sequestering agents and those compounds having free phenolic hydroxyl groups possess anti-oxidant properties and hence are valuable as stabilizers in soaps, oils and the like. The new compounds are particularly useful in the field of medicinal chemistry in that they have been found to possess antiseptic properties and can be employed as antiseptics wherever a general antiseptic is advantageous. It is also probable that many new uses will be found for the new class of compounds of this invention. For instance some of the compounds such as α-methyl-3,4-dihydroxyphenylalanine, α-methyl-3-hydroxy-4-methoxyphenylalanine and α-methyl-3-hydroxyphenylalanine have been found to inhibit in vitro decarboxylation of dihydroxyphenylalanine by mammalian decarboxylase and hence may be of value in the therapy of certain types of hypertension by limiting or halting the production of pressor amines. In this connection all of the new class of compounds do not possess this activity. For example, the isomer of α-methyl-3-hydroxy-phenylalanine when the hydroxy group is at the 4-position does not inhibit this invitro enzymatic decarboxylation of dihydroxyphenylalanine. The intermediate compounds prepared also find other uses such as example α-methyl-N-dichloroacetyl-p-nitrophenylalanine has been found to possess antifungal activity in vitro against certain organisms.

The following examples are given for purpose of illustration:

EXAMPLE 1

α-(3-methoxyphenyl)-aceto acetonitrile, sodium salt

A solution of sodium ethylate was prepared from 90.81 g. (3.86 g. atom) of clean sodium and 1070 ml. of absolute ethanol. To the hot solution was then added a solution of 187.9 g. (1.28 mole) of m-methoxyphenyl-acetonitrile ($n_D^{25}$ 1.5290) in 450 ml. of dry ethyl acetate. A light yellow colored solution formed which was refluxed 3–4 hours. After cooling to room temperature, the sodium salt was precipitated with about 13 l. of petroleum ether, filtered and washed well with petroleum ether, finally ether. Obtained, 275 g. melting unsharp at 280–290° with decomposition.

EXAMPLE 2

α-(3-methoxyphenyl)-aceto acetonitrile

A 275 g. sample of the sodium salt prepared in Example 1 was dissolved in 1,466 ml. of water, solution cooled to 10° C. and 367 ml. of glacial acetic acid added slowly with stirring while maintaining the temperature at 5–10°. The practically solid mass which had formed was stirred another 45 minutes in the ice bath, filtered, and washed with water (2 x 500 ml.) and air dried at room temperature. Obtained 206 g. (83.6%). M. P. 83–85°. An analytically pure sample was obtained by two crystallizations from methanol; M. P. 90–91°.

Analysis.—Calcd. for $C_{11}H_{11}O_2N$: C, 69.80; H, 5.85; N, 7.40. Found: C, 69.83; H, 5.74; N, 7.42.

EXAMPLE 3

Methyl-(3-methoxybenzyl)-ketone

Concentrated sulfuric acid (124 ml.) was added to 30 ml. of water and the solution cooled to −5°. Then 50 g. of crude 3-methoxy phenyl acetoacetonitrile (prepared in Example 2) were added over a period of 1 hour with stirring while keeping the temperature below 10°. After all was added, the mixture was warmed on the steam bath. Since a complete solution was not obtained on heating, the mixture was cooled to room temperature and more dilute sulfuric acid (124 ml. acid, 30 ml. water) was added. Complete solution formed when the mixture was heated on the steam bath. After cooling to 0°, 185 ml. of water was added rapidly when an oil separated. The mixture was heated with stirring for 12 hours on the steam bath, then cooled to room temperature. The oil was extracted repeatedly with ether, and the extracts combined, dried over Drierite, filtered and solvent removed in vacuo. Vacuum distillation of the residual oil yielded 20.1 g. (46.5%) of the ketone and recovery of 11 g. unreacted nitrile. A second vacuum distillation gave an analytically pure sample B. P. 95°–97° C. at 0.7 mm.; $n_D^{25}$=1.5230.

Analysis.—Calcd. for $C_{10}H_{12}O_2$: C, 73.12; H, 7.36. Found: C, 73.36; H, 7.11.

EXAMPLE 4 dl-α-methyl-(3-hydroxy-4-methoxy)-phenylalanine

A mixture of 11.78 g. of methyl-(3,4-dimethoxybenzyl)-ketone, a solution of 4.1 g. of potassium cyanide in 7 ml. water, and a solution of 3.3 g. of ammonium chloride in about 30 cc. water, was heated and stirred at 55° to 60° C. for five and one-half hours, then at room temperature overnight. The yellow lower oily layer became brown in color during the heating period. The next morning a crystalline solid had formed. This compound, the hydrogen chloride acid addition salt of 1-(3,4-dimethoxy phenyl)-2-amino-2-cyano-propane, was filtered, washed with water, and dried at room temperature. Yield 10 g. (77%) of the amino-nitrile, M. P. 103–106° C., with decomposition. To 9.5 g. of this nitrile was added 45 ml. of concentrated hydrochloric acid, and the slightly turbid solution saturated with hydrogen chloride. After heating on the steam bath for 18 hours the solution was chilled, and a small amount of ammonium chloride filtered off. The filtrate was concentrated to dryness in vacuo on the steam bath, and the residue sweetened with water to remove excess acid. The residue was dissolved in 10 ml. hot water and the solution adjusted to pH 6.5 with concentrated ammonium hydroxide. On cooling and scratching the compound crystallized out. This was filtered, washed with alcohol and ether and dried. The compound was purified by dissolving in boiling water, noriting, and concentrating the clear filtrate to a point of crystallization. M. P. 295–296° C. with decomposition. The compound gave a strong ninhydrin and a positive ferric chloride test the latter test being negative on the nitrile.

Analysis.—Calcd. for $C_{11}H_{15}O_4N$: C, 58.65; H, 6.66; N, 6.22; $OCH_3$, 12.35. Found: C, 58.59; H, 6.42; N, 6.50; $OCH_3$, 13.75.

EXAMPLE 5 dl-Alpha methyl-3,4-dihydroxyphenyl alanine

Five tenths of a gram of 3-hydroxy-4-methoxyphenylalanine was dissolved in 20 ml. of concentrated hydrochloric acid, the solution saturated with hydrogen chloride and heated in a sealed tube at 150° C. for 2 hours. The dark reaction mixture was concentrated to dryness in vacuo, excess acid removed by flushing several times with ethanol. On dissolving the dark residue in a minimum amount of water and adjusting the clarified solution to pH 6.5 with ammonium hydroxide the compound separated in fine crystals which were filtered, washed with alcohol and ether. The crystalline product had a melting point of 299.5–300° C. with decomposition. The silver nitrate test for ortho and para dihydric phenols [Wildi, Science 113, 2929 (1951)] was strongly positive. An aqueous solution of the compound reduces the silver solution almost immediately at room temperature, forming a silver mirror. The silver nitrate test is negative on the precursor. The other tests, ninhydrin and ferric chloride, were also positive.

Analysis.—Calcd. for $C_{10}H_{13}NO_4$: C, 57.00; H, 6.20; N, 6.65. Found: C, 56.67; H, 6.02; N, 6.38.

EXAMPLE 6

*dl-Alpha-methyl-3,4-dihydroxyphenylalanine*

One gram of the pure 3-hydroxy-4-methoxyphenylalanine was dissolved in 40 ml. concentrated hydrochloric acid, the solution saturated with hydrogen chloride and heated in a sealed tube at 150° C. for 4 hours. The dark reaction mixture was concentrated to dryness in vacuo, excess acid removed by flushing several times with ethanol. The dark residue was dissolved in 10 ml. of ethanol and small amounts of insoluble centrifuged off. The solvent was removed, the residual syrup dissolved in 10 ml. of acetone and the pH adjusted to 8 with diethylamine. A brown syrup precipitated which soon crystallized. After adjusting to pH 6 with glacial acetic acid the grey precipitate was centrifuged off, washed free of chloride with hot acetone, slightly acidified with glacial acetic acid, then washed with ether. The product melted at 299.5–300° C. with decomposition.

Analysis.—Calcd. for $C_{10}H_{13}NO_4$: C, 57.00; H, 6.20; N, 6.65. Found: C, 57.06; H, 6.13; N, 5.81.

EXAMPLE 7

*4-methyl-4-(3,4-dimethoxybenzyl)-hydantoin*

A mixture of 530 g. of vacuum distilled methyl-(3,4-dimethoxybenzyl)-ketone (2.74 moles), 2300 g. ammonium carbonate (24 moles), 230 g. potassium cyanide (3.54 moles), 6840 ml. water, and 6840 ml. ethanol was stirred and heated at 55°–60° C. for 10 hours. At first an almost complete solution was obtained but soon the hydantoin began to slowly crystallize. The mixture was stirred another 10 hours at room temperature. The mixture was concentrated in vacuo at about 40° C. in a water bath to approximately half its volume. The white crystalline hydantoin was filtered and washed with water until almost a neutral pH and free of cyanide ions, requiring about 2.5 l. water. The product had a melting point of 241.5° to 243.5° C.

Analysis.—Calcd for $C_{13}H_{16}O_4N_2$: C, 59.15; H, 6.10; N, 10.60. Found: C, 59.85; H, 5.84; N, 10.99.

EXAMPLE 8

*α-Methyl-(3,4-dimethoxy)-phenylalanine*

Six hundred and thirty grams of crude 4-methyl-4-(3,4-dimethoxybenzyl) hydantoin (2.39 moles) 3155 g. of barium hydroxide, 15,775 ml. of water were refluxed for 68 hours with occasional swirling. The hydrolysis mixture was poured in 50 l. of water and pH adjusted to 1.6 with 12 l. 2 N sulfuric acid and finally diluted to 100 l. and stirred till pH was finally constant, pH 1.8. After adding some filter aid (Supercel), the mixture was filtered and the clear filtrate concentrated in an enamelled still in vacuo to a volume of about 12 liters (maximum temperature being 70° C.). The turbid concentrate was norited and gravity filtered and further concentrated in vacuo on a steam bath to a syrup which was repeatedly flushed with ethanol. After dissolving the syrupy residue in about 5 liters of acetone (pH 2.2), the pH of the acetone solution of the amino acid salt was then adjusted to 8.8 with diethylamine during which time the amino acid separated as a white crystalline mass. The careful addition of a small amount of glacial acetic acid brought the pH to 6.0 when pH remained constant, the mixture was filtered and the white precipitate first washed with acetone then stirred for several hours with 5 l. of absolute ethanol, filtered, and washed with absolute ethanol and air dried. The product melted at 282°–283.5° C. with decomposition. The dimethoxy precursor, crystallized from water contained 1.5 mole of water of crystallization.

Analysis. — Calcd. for $C_{12}H_{17}O_4N.1\frac{1}{2}H_2O$: $H_2O$, 10.1%. Found by K. Fischer test: $H_2O$, 10.8%.

Analysis on anhydrous sample.—Calcd. for $C_{12}H_{17}O_4N$: C, 60.20; H, 7.16; N, 5.80. Found: C, 59.80; H, 7.36; N, 5.60.

EXAMPLE 9

*dl-α-Methyl-β-(3,4-dihydroxyphenyl)-alanine*

Five hundred and forty-five grams of α-methyl-β-(3,4-dimethoxyphenyl) alanine was refluxed with 5400 ml. of 47.5% hydrobromic acid for 55 hours. During the reflux period the vapor temperature was 125° C., and the reaction mixture was frequently vented directly to the air to permit methyl bromide to escape. After refluxing, the light brown reaction mixture was concentrated under reduced pressure on the steam bath to a brown syrup, which was moistened with acetone and finally dissolved in 5 l. of hot acetone. The slightly turbid acetone solution of the amino acid hydrobromide was gravity filtered and the pH of the filtrate (2.6) adjusted to 8.4 with 400 ml. of diethylamine during which time the compound separated as a brown oil which soon crystallized. The slightly alkaline mixture was stirred for 1½ hours or until the pH remained constant, and then carefully adjusted to pH of 6.0 with 12 ml. glacial acetic acid, and allowed to stand at room temperature overnight. The product was filtered and washed free of bromides with acetone (warm) and finally washed with ether and then air dried at room temperature. M. P. 293–294.5° C. with decomposition.

EXAMPLE 10

*4-methyl-4-(3-methoxybenzyl)-hydantoin*

A 28.35 g. (0.173 mole) sample of methyl-(3-methoxybenzyl)-ketone, prepared according to Example 3, 123.3 g. (1.28 moles) ammonium carbonate, 26.7 g. (0.41 mole) potassium cyanide, 365 ml. ethanol, and 365 ml. of water were stirred and heated at 55–60° C. for 12 hours. Concentration of the reaction mixture to about ⅓ its volume in vacuo at about 60° C. precipitated the white crystalline hydantoin. After filtration the hydantoin was washed with water until pH 7 and air dried. An analytically pure sample was prepared by 3 water crystallizations. M. P. 202–204° C.

Analysis.—Calcd. for $C_{12}H_{14}N_2O_3$: C, 61.60; H, 6.00; N, 11.97. Found: C, 61.94; H, 5.52; N, 11.80.

EXAMPLE 11

*dl-α-Methyl-m-methoxyphenylalanine*

A 5 g. sample of the crude hydantoin prepared in Example 10, 25 g. barium hydroxide and 150 ml. of water were refluxed for 57 hours. The milky hydrolysis mixture was diluted to 750 ml. and boiled briefly. The addition of 70 ml. of 2 N sulfuric acid precipitated all the barium (pH 3.5). The barium sulfate was filtered, washed, and the clear colorless filtrate concentrated in vacuo to dryness, and the residue flushed several times with ethanol. Obtained 5.1 g. of amino acid sulfate which was slurried up in 100 ml. of absolute ethanol and mixture neutralized to pH 6.5 with diethyl amine. The white crystalline-m-methoxy amino acid which precipitated was filtered and washed free of sulfates with absolute ethanol. Air drying yielded 4.08 g. (91.5% yield) M. P. 277° C. dec. An analytically pure sample was obtained by two methanol crystallizations, M. P. 277° C. dec. The α-methyl-m-methoxyphenylalanine gives a strong positive ninhydrin test.

Analysis.—Calcd. for $C_{11}H_{15}O_3N$: C, 63.01; H, 7.24; N, 6.70. Found: C, 63.43; H, 7.00; N, 6.78.

EXAMPLE 12 dl-α-Methyl-β-(m-hydroxyphenyl) alanine

A 2.00 g. sample of crude α-methyl-m-methoxy phenylalanine attained according to Example 11 and 160 ml. concentrated hydrochloric acid were slurried up in a large combustion bomb. The mixture was then saturated with hydrogen chloride while in an ice bath, sealed, and heated at 150° C. for 6 hours in a bomb furnace. After cooling, the reaction mixture was concentrated in vacuo to a semisolid, residue sweetened several times with ethanol, and finally dissolved in 250 ml. absolute ethanol and the clarified (Norite) solution again concentrated in vacuo. The white crystalline amino acid hydrochloride (1.8 g.) was dissolved in 125 ml. hot acetone and the clarified solution (pH 2.8) neutralized with diethyl amine (pH 6.5). A white precipitate formed which gummed up at first but quickly crystallized. After the pH was constant, the mixture was filtered and washed free of chloride with hot acetone, finally with ether; obtained 1.6 g. (84%), M. P. unsharp at about 200° C., with decomposition. Repeated methanol crystallization gave pure α-methyl-m-tyrosine, M. P. 296–297° C. dec. and giving a strong ferric chloride and ninhydrin tests.

*Analysis.*—Calcd. for $C_{10}H_{13}O_3N$; C, 61.50; H, 6.71; N, 7.17. Found: C, 61.57; H, 7.21; N, 7.39.

EXAMPLE 13 dl-α-Methyl-N-dichloroacetylphenylalanine

α-Methylphenylalanine (182 g.) was dissolved in 805 ml. 2.5 N sodium hydroxide and the solution cooled to about −10° C. To the white mushy solid which formed on cooling, 300 g. of dichloroacetyl chloride was added with agitation while keeping the temperature of the reaction mixture at about −5° C. After the addition, the mixture was aged for about half an hour at 0° C. then allowed to warm up to room temperature. Addition of acid (510 ml. 2.5 hydrochloric acid and 510 ml. water changed the mushy precipitate to a fine white powder, which was filtered and washed with water until free of chlorides. Air drying yielded the dichloroacetyl derivative melting at 157.5–160° C. The purified compound when crystallized from a water-dioxane (5:1) mixture, melts at 164–165° C.

*Analysis.*—Calcd. for $C_{12}H_{13}O_3NCl_2$ (290.14): C, 49.15; H, 4.51; N, 4.83. Found: C, 49.49; H, 4.50; N, 4.66.

EXAMPLE 14 dl-α-Methyl-N-dichloroacetyl-β-(4-nitrophenyl)-alanine

To cold (0° C.) fuming nitric acid (168 ml.; sp. gr. 1.5) was added with stirring 84 g. of α-methyl-N-dichloroacetylphenylalanine while keeping the temperature at about 0° C. A slight colored solution formed on addition; when about half was added, a white precipitate formed. After the addition the mixture was stirred for an hour at 0° C., then quenched with several volumes of ice water. After stirring for an hour or so, the white crystalline precipitate was filtered and washed with water until neutral. Crystallization from hot dioxane-water mixture yielded a product having an M. P. of 187–188° C.

*Analysis.*—Calcd. for $C_{12}H_{12}O_5N_2Cl_2$ (335.15); C, 43.08; H, 3.61; N, 8.34. Found: C, 43.16; H, 3.39; N, 8.07.

EXAMPLE 15 dl-α-Methyl-N-dichloroacetyl-β-(4-aminophenyl)-alanine

Fifty grams of α-methyl-N-dichloroacetyl-p-nitrophenylalanine was dissolved in 500 ml. methanol, 300 mg. of platinum oxide were added and the mixture reduced at 41 lbs. of pressure; within an hour 14.5 lbs. was used up (theory 12.4 lbs.). After filtration of the catalyst, the red clear filtrate was concentrated in vacuo and the residual syrup flushed several times with ether. The crystalline residue thus obtained, after air drying weighed 45.3 g. (99.5%), M. P. unsharp at about 104–108° C. with decomposition. After two precipitations with ether from an alcoholic solution, the somewhat hygroscopic amine was dried over sulfuric acid for analysis.

*Analysis.*—Calcd. for $C_{12}H_{14}N_2O_3Cl_2\cdot\frac{1}{2}H_2O$ (314.2); C, 45.90; H, 4.81; N, 8.91; $H_2O$, 2.9. Found: C, 46.15; H, 6.23; N, 8.31; $H_2O$, 3.6.

EXAMPLE 16 dl-α-Methyl-β-(4-hydroxyphenyl)-alanine

Ten grams of the amine prepared as in Example 15 was dissolved in 5 ml. of 50% sulfuric acid at room temperature; the viscous solution was then cooled in ice and a solution of sodium nitrite (2.4 g.) in 10 ml. water gradually added with agitation. A flocculent precipitate formed. After all the nitrite had been added, the mixture was aged in ice for an hour, after which it was allowed to warm up to room temperature. Nitrogen cam off and the precipitate changed to a sticky oil. After heating on the steam bath until evolution of nitrogen ceased, the oil was extracted with ethyl acetate. After removal of the solvent in vacuo, 9.4 g. of colored solid residue was obtained, which was refluxed with 150 ml. hydrochloric acid (1:1) for 17 hours. The resulting dark solution, after Norite treatment and extraction with ethyl acetate, was concentrated in vacuo to dryness and the tan colored residue (7.4 g.) sweetened with ethanol. Dissolution of the residue in minimum amount of ethanol and neutralization with diethylamine of the clarified solution, precipitated the α-methyl tyrosine, which was filtered, washed with ethanol (until free of chlorides) and ether. The crude amino acid melted at 309° C. with decomposition. For further purification, it was dissolved in 250 ml. of a saturated sulfur dioxide-water solution, and the solution, after Noriting, concentrated to about 80 ml., the tan colored solid filtered washed with ethanol and ether. Obtained 1.5 g. of α-methyl tyrosine, M. P. 320° C. dec. The compound gave a positive ninhydrin test on heating for several minutes with the reagent; the ferric chloride test was weak as with dl-tyrosine. Its solubility in water at room temperature is 0.57 mg./cc. as compared to 0.35 mg./cc. for dl-tyrosine. On concentration of the mother liquor a second crop could be obtained. For analysis the compound was dried in vacuo at 100°.

*Analysis.*—Calcd. for $C_{10}H_{13}NO_3$: C, 61.49; H, 6.71; N, 7.18. Found: C, 61.32; H, 6.76; N, 6.93.

EXAMPLE 17

Sodium salt of α-(3,4-dimethoxyphenyl)-acetoacetonitrile

A solution of sodium ethylate was prepared from 9.1 g. (0.39 gram atom) of clean sodium and 106 ml. of absolute ethanol. To this solution (hot) was then added a solution of 23.4 g. (0.132 mole) of 3,4-dimethoxyphenyl acetonitrile in 40 g. (0.454 mole) of dry ethyl acetate. A light orange colored solution was formed and this was refluxed for 3 hours. After the first half hour a white precipitate formed. The mixture was allowed to stand at room temperature overnight. A white crystalline mass had formed which was stirred and cooled (ice bath) for one hour after adding another 20 ml. ethyl acetate. The compound was filtered, washed with ethyl ether, and dried at room temperature. Obtained 39.5 g.; M. P. 300–302° C. with decomposition.

EXAMPLE 18

α-(3,4-dimethoxyphenyl)-acetoacetonitrile

Thirty-nine and one-half grams of the sodium salt, prepared as in Example 17, was dissolved in 200 ml. of water, chilled to +10° C. and 40 ml. of glacial acetic acid were added slowly while cooling and shaking. A practically solid mass was formed. This was filtered, washed with water, and dried at room temperature. Obtained 29.5 g. (100%), M. P. 74–82° C. An analytically pure sample was prepared by crystallization from methanol; M. P. 98–100° C.

*Analysis.*—Calcd. for $C_{12}H_{13}O_3N$: C, 65.74; H, 5.98; N, 6.34. Found: C, 65.62; H, 5.87; N, 6.04.

EXAMPLE 19

*Methyl-(3,4-dimethoxybenzyl)-ketone*

A mixture of 15 ml. of water and 62 ml. of concentrated sulfuric acid was cooled to −10° C. To this solution was added 25 g. of crude 3,4-dimethoxy-phenyl acetoacetonitrile over a period of one hour with shaking while keeping the temperature below +20° C. There was practically complete solution after each addition. After all was added the mixture was warmed on the steam bath until solution was complete and then for five minutes longer. After cooling to 0°, 222 ml. of water was added rapidly, and heated on the steam bath. After a short time a small amount of white solid crystallized out and a brown oily layer formed on top. Heating was continued for 3 hours, then the mixture was cooled to room temperature. The oil was extracted five times with 50 ml. of ethyl ether; and the combined ether extracts washed with water containing a small amount of sodium hydroxide to pH 6. The ether solution was dried over sodium sulfate and concentrated in vacuo, on the steam bath. 14.2 g. (64%) of an orange oil was obtained which was purified by vacuum distillation. Yield of pure product 11.8 g. (53%), B. P. 118° C. at 0.4 mm., $n_D^{27}$ 1.5341.

*Analysis.*—Calcd. for $C_{11}H_{14}O_3$: C, 68.03; H, 7.27. Found: C, 67.64; H, 7.07.

EXAMPLE 20

*dl-α-Methyl-β-(4-nitrophenyl)-alanine*

On refluxing one gram of α-methyl-N-dichloroacetyl-p-nitrophenylalanine with 12.5 ml. 6 N HCl for 7–8 hours and allowing the clear slightly colored solution to stand overnight, the hydrochloride of α-methyl-p-nitrophenylalanine separated in clusters of needles. Obtained, 300 mg. (38.6%) melting at 268° with dec. Extraction of the solid with ethylacetate and ether gave an analytically pure compound (M. P. 275–277° dec.) which was the hydrochloride salt of dl-α-methyl-β-(4-nitrophenyl)-alanine.

*Analysis.*—Calcd. for $C_{10}H_{13}N_2O_4Cl$ (260.7): C, 46.06; H, 5.04; N, 10.76. Found: C, 46.07; H, 4.89; N, 10.57.

A clarified solution of above hydrochloride (5.1 g.) in 135 ml. ethanol (abs.) was adjusted to pH=6.5 with diethylamine (2.7 ml.) and the white precipitate, after cooling and standing, filtered and washed with ethanol (until free of chlorides) and ether. On air drying obtained, 4.4 g. (88%) M. P. 248–252°. Crystallization from 10 parts boiling water, followed by concentration of the liquor to about half the volume, gave the pure α-methyl-p-nitrophenylalanine in a 71% yield (M. P. 271–273°).

*Analysis.*—Calcd. for $C_{10}H_{12}N_2O_4$ (224.2): C, 53.57; H, 5.40; N, 12.50. Found: C, 53.84; H, 5.10; N, 12.34.

Any departure from the above description which conforms to the present invention is intended to be included within the scope of the claims.

We claim:

1. A compound selected from the group consisting of compounds having the formulas

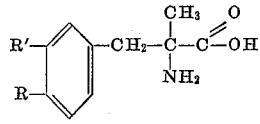

and

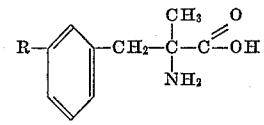

wherein R is selected from the group consisting of hydroxy, alkoxy and acyloxy radicals having a carbon chain length of from 1 to 4 carbon atoms, and R' is selected from the group consisting of hydrogen, hydroxy, alkoxy and acyloxy radicals having a carbon chain length of from 1 to 4 carbon atoms; and salts thereof.

2. α-Methyl-(3-hydroxy-4-methoxy)-phenylalanine.
3. α-Methyl-(3,4-dihydroxyphenyl)-alanine.
4. α-Methyl-(3,4-dimethoxy)-phenylalanine.
5. α-Methyl-(3-methoxyphenyl)-alanine.
6. α-Methyl-β-(3-hydroxyphenyl)-alanine.

References Cited in the file of this patent

UNITED STATES PATENTS

| | | |
|---|---|---|
| 1,861,458 | Sobotka | June 7, 1932 |
| 2,561,284 | Long | July 17, 1951 |
| 2,562,198 | McKinney et al. | July 31, 1951 |
| 2,605,282 | Britton et al. | July 29, 1952 |
| 2,650,242 | Cardinal | Aug. 25, 1953 |

FOREIGN PATENTS

| | | |
|---|---|---|
| 275,443 | Germany | Sept. 7, 1913 |
| 752,328 | Germany | Oct. 3, 1950 |

OTHER REFERENCES

Mannich: Chem. Abstracts, vol. 4, 1044 (1910).

Chem. Abstracts, volume 39, December 20, 1945, p. 5893.

Fieser et al.: Organic Chemistry, pp. 441–442 (1950).

Clemo et al.: J. Chem. Soc., pp. 3844–3848 (1952).